United States Patent
Hsieh

(10) Patent No.: US 8,326,321 B2
(45) Date of Patent: Dec. 4, 2012

(54) MOBILE TERMINALS SEARCHING SYSTEM AND METHOD EMPLOYING THE SAME

(75) Inventor: Hsing-Yuan Hsieh, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 365 days.

(21) Appl. No.: 12/575,875

(22) Filed: Oct. 8, 2009

(65) Prior Publication Data

US 2010/0137000 A1  Jun. 3, 2010

(30) Foreign Application Priority Data

Dec. 3, 2008 (CN) .......................... 2008 1 0305942

(51) Int. Cl.
*H04W 64/00* (2009.01)
(52) U.S. Cl. .................... 455/456.1; 455/456.6
(58) Field of Classification Search .............. 455/404.2, 455/456.1, 456.5, 456.6, 462
See application file for complete search history.

(56) References Cited

U.S. PATENT DOCUMENTS

| | | | |
|---|---|---|---|
| 2005/0032541 A1* | 2/2005 | Wang et al. | 455/522 |
| 2010/0075629 A1* | 3/2010 | Anderson | 455/404.2 |
| 2010/0138441 A1* | 6/2010 | Ryu | 707/769 |

* cited by examiner

*Primary Examiner* — Sam Bhattacharya
(74) *Attorney, Agent, or Firm* — Altis Law Group, Inc.

(57) ABSTRACT

An exemplary mobile terminal searching system includes a base station, a locating terminal, and target terminal. The base station includes a controlling unit, a signal communicating unit, a storage unit, and a positioning unit. The locating terminal is configured for setting searched phone numbers and sending the searched phone numbers to the base station via the signal communicating unit. The signal storage unit is configured for storing the searched phone numbers controlled by the controlling unit. The positioning unit is configured for determining the position information of the target terminal, and the position information is sent to the locating terminal via the signal communicating unit.

17 Claims, 2 Drawing Sheets

MOBILE TERMINALS SEARCHING SYSTEM AND METHOD EMPLOYING THE SAME

BACKGROUND

1. Technical Field

The disclosure generally relates to mobile terminals searching systems and methods, more particularly, to a mobile terminals searching system and a searching method use for quickly searching mobile terminals.

2. Description of the Related Art

Many mobile terminals for wireless communication, such as mobile phones, personal digital assistants (PDAs), are widely used for communicating such as calling, sending/receiving messages, etc.

However, many mobile terminals do not have a function to identify the position of the mobile terminal (e.g. geographical area), particularly when the terminal's users get lost or during disasters, such as avalanches, earthquakes etc. These users may be unable to identify their position or get in touch with other users of mobile terminals. Thus, it is important for other users to promptly and quickly be able to identify the position and find the lost users, etc.

Therefore, there is room for improvement within the art.

BRIEF DESCRIPTION OF THE DRAWINGS

Many aspects of a mobile terminals searching system and method employing the same can be better understood with reference to the following drawings. The components in the drawings are not necessarily drawn to scale, the emphasis instead being placed upon clearly illustrating the principles of the exemplary mobile terminals searching system and method employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
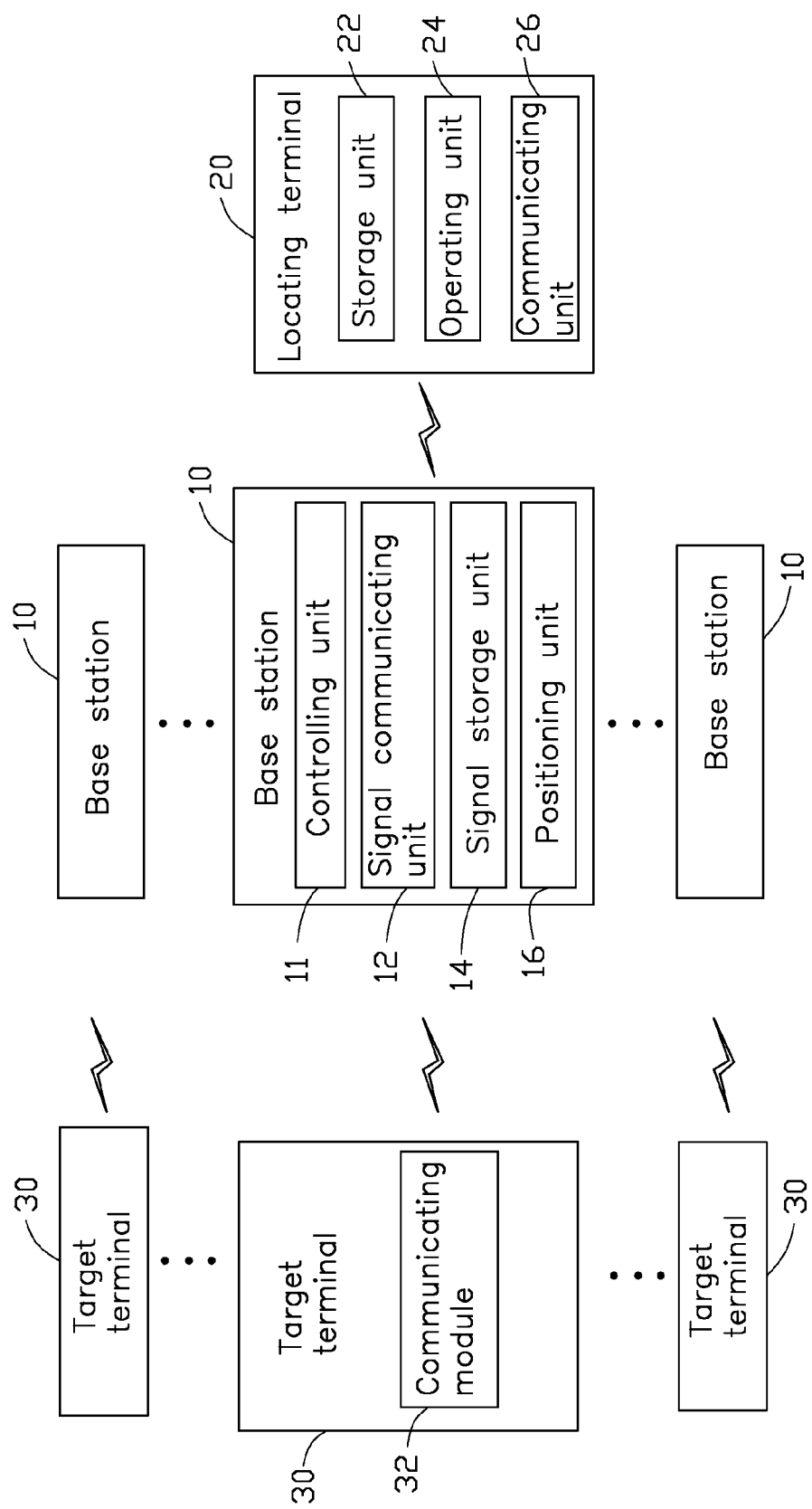
FIG. 1 is a block diagram of a mobile terminals searching system, according to an exemplary embodiment.

Referring to FIG. 1, an exemplary embodiment of a mobile terminals searching system includes a plurality of base stations 10, a locating terminal 20 and a plurality of target terminals 30. The locating terminal 20 is used to search and locate the target terminals 30. The locating terminal 20 and each target terminal 30 are wireless communication devices, such as mobile phones, PDAs, etc, which can communicate with each other through base stations 10. The locating terminal 20 can search for target terminals 30 across the coverage scopes of various base stations 10. Signal transmission power of the locating terminal 20 and the target terminals 30 can be controlled by the base stations 10.

Each base station 10 includes a controlling unit 11, a signal communicating unit 12, a signal storage unit 14, and a positioning unit 16. The controlling unit 11 is a processor electronically connected to the signal communicating unit 12, the signal storage unit 14, and the positioning unit 16.

The signal communicating unit 12 is controlled by the controlling unit 11 and configured for receiving and sending phone numbers of the locating terminal 20 and the target terminals 30. The controlling unit 11 is used to determine whether or not the phone numbers of the locating terminal 20 and the target terminals 30 belong to the same telecommunication providers. If the telecommunication providers of the locating terminal 20 are different from the target terminals 30, the base stations 10 of different telecommunication providers will exchange communication protocols to search the target terminals 30. The signal communicating unit 12 can be integrated with a transmission device, such as an antenna.

The signal storage unit 14 is a memory for storing the phone numbers of the target terminals 30 sent to the base stations 10 by the locating terminal 20.

The positioning unit 16 is configured for determining the distance between the locating terminal 20 and the target terminals 30 according to the signal transmission power of the locating terminal 20 and the target terminals 30. The positioning unit 16 can also determine the position of the target terminals 30 according to radio signals from the target terminals 30.

The positioning unit 16 includes a navigation map therein having an addressing function. The navigation map is configured for recording corresponding map relationships of signal transmission power and distance between the locating terminal 20 and the target terminals 30. Thus, the positioning unit 16 can quickly identify the distance between the locating terminal 20 and each target terminals 30, and the position of the target terminals 30 by querying the navigation map.

The locating terminal 20 includes a storage unit 22, an operating unit 24, and a communicating unit 26. The operating unit 24 is electronically connected to the storage unit 22 and the communicating unit 26.

The storage unit 22 is a memory for storing the phone numbers therein. The storage unit 22 can be a conventional storage device of the locating terminal 20, such as a subscriber identify model (SIM) card. The operating unit 24 is configured for setting searched phone numbers and the search range and may be combined with a typical signal input device of the locating terminal 20, such as a keypad. The communicating unit 26 is configured for sending the set searched phone numbers and search range to the base stations 10, and receiving the position information of the target terminals 30. The communicating unit 26 can be integrated with an existing transmission device, such as an antenna.

Each target terminal 30 includes a communicating module 32 for communicating with the base stations 10. The communicating module 32 can be integrated with an existing transmission device, such as an antenna.

Figure 2:
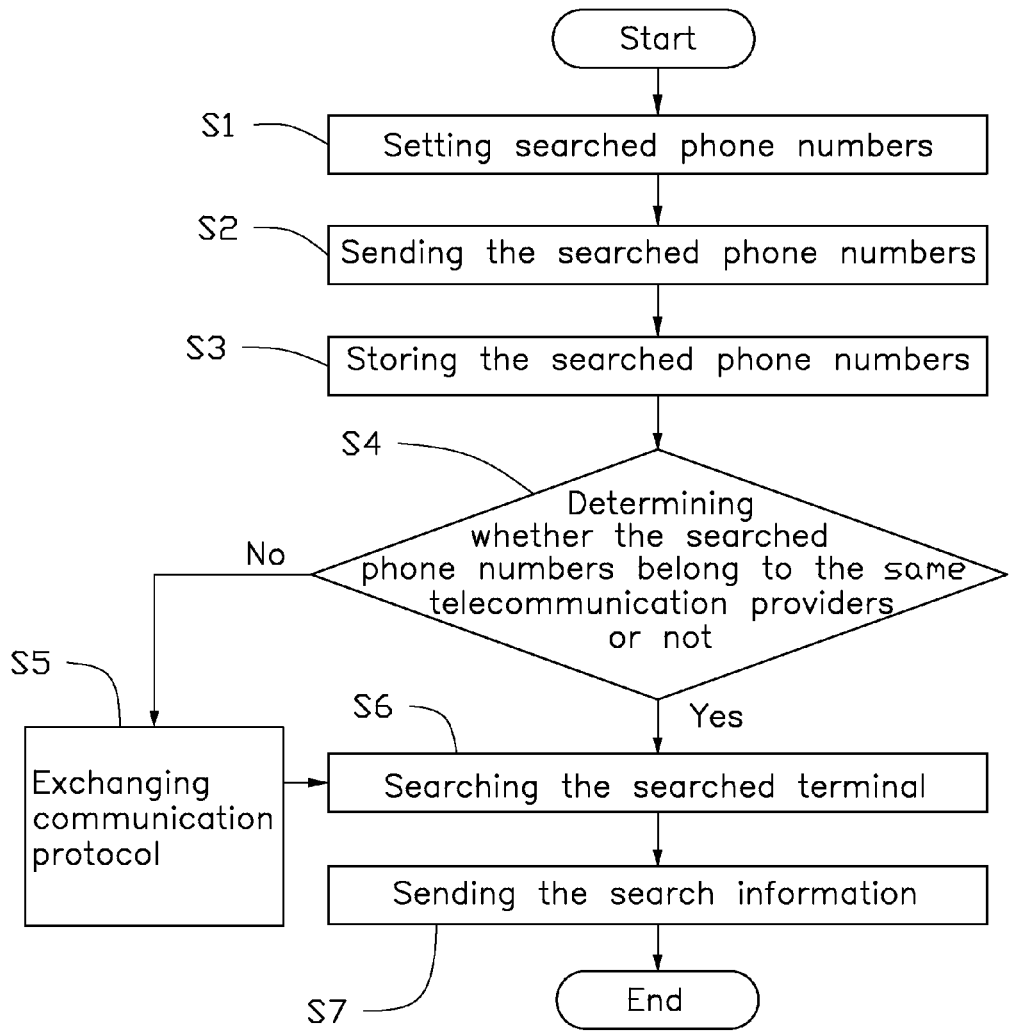
FIG. 2 is a flow chart illustrating a searching method, according to an exemplary embodiment.

Also referring to FIG. 2, a searching method in accordance with an exemplary embodiment is depicted. The searching method can use the aforementioned mobile terminals searching system to search for the target terminals 30. The searching method may at least include the following steps:

In step S1, the searched phone numbers and search range for each target terminals 30 are set in the locating terminal 20 using the operating unit 24.

In step S2, the searched phone numbers set by the operating unit 24 are sent to the signal communicating unit 12 using communicating unit 26 of the locating terminal 20.

In step S3, the searched phone numbers received by signal communicating unit 12 are stored in the signal storage unit 14 controlled by the controlling unit 11.

In step S4, the controlling unit 11 determines whether or not the searched phone numbers set by the locating terminal 20 and the phone number of the locating terminal 20 belong to the same telecommunication providers. If the telecommunication providers of the locating terminal 20 are different from the target terminals 30, then go to step S5; if the telecommunication provider of the locating terminal 20 is same with the target terminals, then go to step S6.

In step S5, the base stations 10 of different telecommunication providers exchange communication protocols, and the searched phone numbers are sent to the signal communicating unit 12 of the base station 10.

In step S6, the positioning unit 16 determines the distance between the locating terminal 20 and the target terminals 30, and the position of the target terminal 30.

In step S7, the signal communicating unit 12 sends the distance and position information from the positioning unit 16 to the communicating unit 26 of the locating terminal 20 in the form of, for example, text messages.

In the mobile terminals searching system 100 of the exemplary embodiment, the controlling unit 11 and the positioning unit 16 of the base station 10 can promptly identify the position information of the target terminals 30 according to the signal transmission power and the signal transmission of the locating terminal 20 and the target terminals 30. The position information of the target terminals 30 can be sent to the locating terminal 20 in the form of text messages. Thus, there is no need to set up expensive positioning device in the mobile terminal, such as global positioning system (GPS).

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A mobile terminals searching system, comprising:
   a base station comprising a controlling unit, a signal communicating unit, a signal storage unit, and a positioning unit, the controlling unit being electronically connected to the signal communicating unit, the signal storage unit, and the positioning unit;
   a locating terminal communicating with the base station, setting searched phone numbers and sending the searched phone numbers to the base station by the signal communicating unit controlled by the controlling unit; and
   a target terminal communicating information with the locating terminal through the base station, the searched phone numbers being stored in the signal storage unit controlled by the controlling unit, the positioning unit determining a distance between the locating terminal and the target terminal according to signal transmission power of the locating terminal and the target terminal, the positioning unit further determining a position of the target terminal according to radio signals from the target terminal, and the distance and the position information being sent to the locating terminal using the signal communicating unit.

2. The mobile terminals searching system as claimed in claim 1, wherein the locating terminal comprises a storage unit configured for storing the searched phone numbers set by the locating terminal.

3. The mobile terminals searching system as claimed in claim 1, wherein the locating terminal further comprises an operating unit for setting the searched phone numbers.

4. The mobile terminals searching system as claimed in claim 1, wherein the locating terminal further comprises a communicating unit for sending the searched phone numbers set by the locating terminal to the signal communicating unit of the base station, and receiving the position information from the base station.

5. The mobile terminals searching system as claimed in claim 1, wherein the target terminal comprises a communicating module for communicating with the base station and the locating terminal.

6. The mobile terminals searching system as claimed in claim 1, wherein the controlling unit determines whether or not the searched phone numbers set by the locating terminal and the phone number of the locating terminal belong to the same telecommunication providers.

7. The mobile terminals searching system as claimed in claim 6, wherein if the phone number of the locating terminal and the phone numbers of the target terminals belong to different telecommunication providers, the base stations of different telecommunication providers exchange communication protocols, and the searched phone numbers are sent to the signal communicating unit of the base station.

8. The mobile terminals searching system as claimed in claim 1, further comprising a plurality of base stations.

9. The mobile terminals searching system as claimed in claim 8, further comprising a plurality of target terminals for communicating with the locating terminal through the base stations.

10. The mobile terminals searching system as claimed in claim 1, wherein the positioning unit comprises a navigation map having an addressing function and recording the map relationship of signal transmission power and distance between the locating terminal and the target terminal.

11. A mobile terminal searching method, comprising steps of:
    setting searched phone numbers for target terminals in a locating terminal;
    sending the searched phone numbers to a signal communicating unit of a base station;
    storing the searched phone numbers from the locating terminal in a signal storage unit of the base station;
    determining a distance between the locating terminal and the target terminal using a positioning unit associated with the base station according to signal transmission power between the locating terminal and the target terminal; and
    determining a position of the target terminal according to radio signals from the target terminal.

12. The mobile terminals searching method as claimed in claim 11, further comprising determining whether or not the searched phone numbers set by the locating terminal and the phone number of the locating terminal belong to the same telecommunication providers.

13. The mobile terminals searching method as claimed in claim 12, further comprising exchanging communication protocols among different telecommunication providers when the searched phone numbers set by the locating terminal and the phone number of the locating terminal belonging to different telecommunication providers.

14. The mobile terminals searching method as claimed in claim 12, further comprising searching for the target terminal by the positioning unit according to the searched phone numbers when the phone number of the locating terminal and the phone numbers of the target terminals belonging to the same telecommunication provider.

15. The mobile terminals searching method as claimed in claim 14, further comprising sending the distance and the position information to the communicating unit of the locating terminal after the step of searching for the target terminal by the positioning unit according to the searched phone numbers.

16. The mobile terminals searching method as claimed in claim 11, wherein the mobile terminal system further comprises a plurality of base stations.

17. The mobile terminals searching method as claimed in claim 11, wherein the mobile terminal system further comprises a plurality of target terminals for communicating with the locating terminal through the base stations.

* * * * *